United States Patent
Iso

(10) Patent No.: US 7,402,550 B2
(45) Date of Patent: *Jul. 22, 2008

(54) ROLLING BEARING

(75) Inventor: Kenichi Iso, Kanagawa (JP)

(73) Assignee: NSK Ltd., Tokyo (JP)

( * ) Notice: Subject to any disclaimer, the term of this patent is extended or adjusted under 35 U.S.C. 154(b) by 378 days.

This patent is subject to a terminal disclaimer.

(21) Appl. No.: 10/900,155

(22) Filed: Jul. 28, 2004

(65) Prior Publication Data

US 2004/0266632 A1 Dec. 30, 2004

Related U.S. Application Data

(63) Continuation of application No. 10/141,948, filed on May 10, 2002.

(30) Foreign Application Priority Data

| May 11, 2001 | (JP) | ............ P.2001-141776 |
| Apr. 15, 2002 | (JP) | ............ P.2002-112156 |
| Apr. 30, 2002 | (JP) | ............ P.2002-128274 |

(51) Int. Cl.
*C10M 163/02* (2006.01)
*F16C 33/10* (2006.01)

(52) U.S. Cl. ............ 508/182; 508/181; 508/539; 508/552; 508/582; 384/13

(58) Field of Classification Search ............ 508/181, 508/182

See application file for complete search history.

(56) References Cited

U.S. PATENT DOCUMENTS

| 4,941,987 | A | | 7/1990 | Strepparola et al. |
| 5,840,666 | A | * | 11/1998 | Yokouchi et al. ............ 508/291 |
| 5,910,470 | A | * | 6/1999 | Minami et al. ............ 508/468 |
| 5,948,737 | A | | 9/1999 | Srinivasan et al. |
| 6,329,326 | B1 | * | 12/2001 | Iso et al. ............ 508/182 |
| 6,444,621 | B1 | | 9/2002 | Okaniwa et al. |
| 2002/0072477 | A1 | | 6/2002 | Ikejima et al. |
| 2003/0013617 | A1 | | 1/2003 | Howell et al. |

FOREIGN PATENT DOCUMENTS

| JP | 07-268370 A | 10/1995 |
| JP | 11-228985 A | 8/1999 |
| JP | 11-246886 A | 9/1999 |
| JP | 2000-273478 A | 3/2000 |
| JP | 2000-328083 A | 11/2000 |

* cited by examiner

*Primary Examiner*—Ellen M. McAvoy
(74) *Attorney, Agent, or Firm*—Sughrue Mion, PLLC

(57) ABSTRACT

A rolling bearing holding two or more rolling elements 13 between inner ring 10 and outer ring 11 in such a way that these rolling elements can freely roll, and packed with a grease is described, wherein the grease is a mixture of at least one of metal complex soap-based grease and urea-based grease, each incorporated with 8 to 35% by mass of thickening agent, and fluorine-based grease comprising perfluoropolyether oil as a base oil incorporated with 15 to 42.5% by mass of polytetrafluoroethylene as a thickening agent, ratio of said at least one of the metal complex soap-based grease and urea-based grease versus said fluorine-based grease being 40 to 80:60 to 20 by mass, and total content of the thickening agents being 20 to 30% by mass.

8 Claims, 2 Drawing Sheets

ROLLING BEARING

CROSS-REFERENCE TO RELATED APPLICATIONS

This application is a continuation of U.S. application Ser. No. 10/141,948 filed May 10, 2002, the disclosure of which is incorporated herein by reference.

FIELD OF THE INVENTION

This invention relates to a rolling bearing packed with a grease composition, in particular a rolling bearing for electrically driven motors, couplings or the like for cooling fans which send cooling air to automobile engine radiators, serviceable over a wide temperature range from high temperature of around 200° C. to low temperature around −40° C., and having long service life before seizure and rust preventive performances.

BACKGROUND OF THE INVENTION

An automobile has been required to be compacter and lighter, and to have an expanded passenger space, which needs the compacter engine room, and hence the compacter, lighter electronic device members and engine accessories. Moreover, the engine room is more closed to meet the requirements of noise suppression, which is accompanied by increased temperature within the engine room and hence needs the engine members to withstand higher temperature. These members are frequently arranged below the engine room, tending to be exposed to rainwater while running. Therefore, the grease for the rolling bearing in these sections is required to be more rust-preventive than those for other sections.

The bearing for, e.g., electrically driven fan motors has been used at 130 to 150° C. However, increased temperature in the engine room calls for the bearing which can withstand higher temperature of 180 to 200° C. One of the measures for the bearing operating at a conventional temperature level of 150° C. or lower is lubrication with the packed grease comprising a synthetic base oil incorporated with a urea-based compound, as disclosed by, e.g., Japanese Patent No. 1,982,669. This grease, however, causes seizure in an early stage when used at high temperature of 160° C. or higher. Therefore, more heat-resistant greases have been in demand.

It is known that the bearing is serviceable in an atmosphere of 160° C. or higher, when packed with, for example, a fluorine-based grease comprising a perfluoropolyether oil as a base oil which is incorporated with polytetrafluoroethylene (PTFE) as a thickening agent to improve resistance to heat. However, it tends to have deteriorated rust preventive performance, because of difficulty in incorporating a rust preventive agent to be used in the common synthetic oil-based grease. Dispersion of a solid rust preventive agent may be one method, which, however, greatly deteriorates the acoustic performance of the grease. The fluorine-based grease has another disadvantage of being 5 to 20 times more expensive than the synthetic oil-based grease.

The grease composition comprising a urea-based grease incorporated with fluorine oil for improved resistance to heat is known, as disclosed by Japanese Patent Laid-open Publication No. 11-181465. Such a grease composition, however, suffers the notable phase separation, because of no affinity of the base oil of mineral or synthetic oil for the fluorine oil, and hence unsuitable for the bearing which supports members rotating at a high speed, e.g., electrically driven fan motors.

Another type of known grease comprises a base oil comprising hydrogenated mineral or synthetic oil and fluoropolyether oil, as disclosed by Japanese Patent Laid-open Publication No. 07-268370. However, this grease involves the problems of the phase separation and low stability to shear stress, because of low thickening agent content of 3 to 20% by mass based on the amount of the grease.

As described above, the bearing for electrically driven fan motors and couplings for cooling fans which send cooling air to automobile engine radiators, being set in an atmosphere of higher temperature, tends to have decreased service life before seizure. It is therefore necessary to further improve resistance to heat of the grease for the bearing, to secure the service life. At the same time, the grease for the bearing is required to be more rust-preventive than those for other sections, because the bearing is arranged in a section tending to be exposed to rainwater while running. Moreover, it is required to have sufficient fluidity at low temperature, to prevent noise when the engine is started under a low temperature condition. However, the bearing packed with the conventional grease cannot meet the requirements of the electrically driven fan motors and couplings.

SUMMARY OF THE INVENTION

The present invention has been made under the above situations. It is an object of the present invention to provide a rolling bearing having a sufficient service life at high temperature before seizure, rust preventive characteristics and fluidity at low temperature, and relatively inexpensive.

The present invention provides a rolling bearing holding two or more rolling elements between inner and outer rings in such a way that these rolling elements can freely roll, and packed with a grease, wherein the grease is a grease composition comprising a mixture of at least one of metal complex soap-based grease and urea-based grease, each incorporated with 8 to 35% by mass, based on the amount of the metal complex soap-based grease or the urea-based grease, of thickening agent, and fluorine-based grease comprising perfluoropolyether oil as a base oil incorporated with 15 to 42.5% by mass, based on the amount of the fluorine-based grease, of polytetrafluoroethylene as a thickening agent, ratio of the at least one of the metal complex soap-based grease and urea-based grease versus the fluorine-based grease being 40 to 80:60 to 20 by mass, and total content of the thickening agents being 20 to 30% by mass based on the amount of the grease composition.

The grease composition packed in the rolling bearing of the present invention contains the fluorine-based grease at a given content to keep excellent durability at high temperature, which also exhibits excellent fluidity at low temperature by virtue of low viscosity of its base oil. At the same time, the grease composition can keep excellent rust-preventive characteristics by virtue of the metal complex soap-based grease or urea-based grease incorporated at a given content, which allows various rust preventive agents to be incorporated in the composition by the functions of the mineral or synthetic oil as the base oil for the greases. Moreover, the metal complex soap-based grease and urea-based grease are inexpensive, making the grease composition as a whole less expensive than the fluorine-based grease alone.

DESCRIPTION OF THE REFERENCE NUMERALS AND SINGS

1 Ball bearing
10 Inner ring
11 Outer ring
12 Cage
13 Ball
14 Seal member

DETAILED DESCRIPTION OF THE INVENTION

Figure 1:
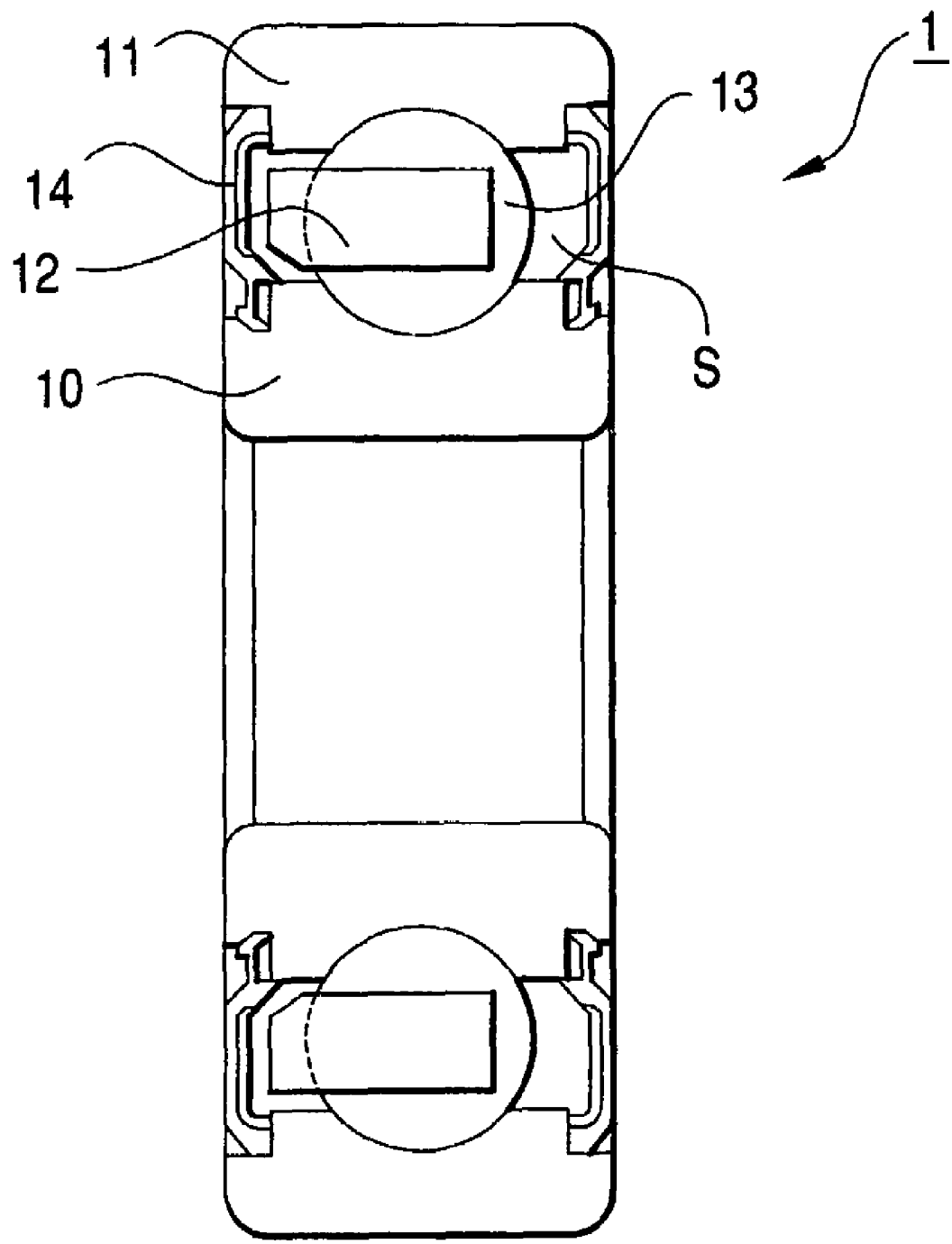
FIG. 1 is a sectional view of the ball bearing as one of the embodiments of the rolling bearing of the present invention.

In the present invention, the rolling bearing structure itself is not limited, and one of the examples is the ball bearing 1 whose section is shown in FIG. 1. This ball bearing holds two or more balls 13 as the rolling elements between an inner ring 10 and an outer ring 11 via a cage 12 in such a way that these balls 13 can freely roll, is packed with a grease composition, where the grease composition (not shown) is put in the space S formed by the inner ring 10, outer ring 11 and ball 13, and is sealed by a seal member 14.

The grease composition for use in the present invention rises a mixture of at least one of metal complex soap-based grease and urea-based grease, and fluorine-based grease, incorporated in a given ratio. These greases are described in detail, below.

<Metal Complex Soap-based Grease and Urea-based Grease>

The metal complex soap-based grease and urea-based grease may be selected, as required, from the respective ones commonly used. Each of the metal complex soap-based grease and urea-based grease preferably has a kinematic viscosity of 10 to 400 mm$^2$/second when the base oil is kept at 40° C., more preferably 20 to 250 mm$^2$/second, still more preferably 40 to 150 mm$^2$/second, in order to prevent noise generated, when the engine is started at low temperature, and seizure, the former resulting from insufficient fluidity of the grease composition at low temperature, and the latter from difficulty of the grease in forming the oil film at high temperature.

It can be said that the preferable base oil types include mineral oil-based lubricants and synthetic oil-based lubricants, because they can easily contain additives, e.g., rust preventive agent. The preferable mineral oil-based lubricants include mineral oils refined by optionally selected combinations of processes, e.g., vacuum distillation, solvent deasphalting, solvent extraction, hydrocracking, solvent dewaxing, sulfuric acid treatment, clay treatment and hydrotreatment. The synthetic oil-based lubricants include hydrocarbon-, aromatic-, ester- and ether-based oils. The hydrocarbon-based oils include poly-a-olefins, e.g., normal paraffin, isoparaffin, polybutene, polyisobutylene, 1-decene oligomer, 1-decene/ethylene cooligomer, and hydrogenated products thereof. The aromatic-based oils include alkyl benzenes, e.g., monoalkyl benzene and dialkyl benzene; and alkyl naphthalenes, e.g., monoalkyl naphthalene, dialkyl naphthalene and polyalkyl naphthalene. The ester-based oils include diester oils, e.g., dibutyl sebacate, di-2-ethylhexyl sebacate, dioctyl adipate, diisodecyl adipate, ditridecyl adipate, ditridecyl glutarate and methyl acetylsinolate; aromatic ester oils, e.g., trioctyl trimellitate, tridecyl trimellitate and tetraoctyl pyromellitate; polyol esters, e.g., trimethylol propane caprylate, trimethylol propane pelargonate, pentaerythritol-2-ethylhexanoate and pentaerythritol pelargonate; and complex ester oils, e.g., oligoester of polyhydric alcohol and a mixed fatty acid of dibasic and monobasic acids. The ether-based oils include polyglycols, e.g., polyethylene glycol, polypropylene glycol, polyethylene glycol monoether and polypropylene glycol monoether; and phenyl ether oils, e.g., monoalkyl triphenyl ether, alkyl diphenyl ether, dialkyl diphenyl ether, pentaphenyl ether, tetraphenyl ether, monoalkyl tetraphenyl ether and dialkyl tetraphenyl ether. These compounds may be used either individually or in combination for the base oil, and the base oil is generally adjusted at the desired kinematic viscosity, described above. Of these compounds, the ether- and ester-based oils are more preferable, for their relatively -high affinity for perfluoropolyether oil as the base oil for the fluorine-based grease.

The thickening agents useful for the metal complex soap-based grease include a metal complex soap selected from the group consisting of those of Li, Na, Ba, Ca and the like, and a mixture thereof. The thickening agents useful for the urea-based grease include a diurea, triurea, tetraurea and polyurea compound, and mixture thereof. These thickening agents may be used either individually or in combination.

The thickening agent is incorporated in each of the metal complex soap-based grease and urea-based grease at 8 to 35% by mass, preferably 10 to 30% by mass, based on the amount of the metal complex soap-based grease or the urea-based grease. The numeral expressed with the unit "% by mass" as used herein is the almost the same as the numeral expressed with the unit "% by weight".

The metal complex soap-based grease and urea-based grease may be used either individually or in combination, as required. The urea-based grease is more preferable, in consideration of the resistance to heat and acoustic characteristics of the grease composition. When they are used in combination, their ratio is optionally set, as required.

<Fluorine-based Grease>

The fluorine-based greases useful for the present invention include the one comprising perfluoropolyether oil (PFPE) as the base oil incorporated with polytetrafluoroethylene (PTFE) as the thickening agent. PFPE preferably has a kinematic viscosity of 20 to 400 mm$^2$/second at 40° C., more preferably 30 to 200 mm$^2$/second, in order to prevent noise generated, when the engine is started at low temperature, and seizure, the former resulting from insufficient fluidity of the grease composition at low temperature, and the latter from difficulty of the grease in forming the oil film at high temperature.

PFPE useful for the present invention is not limited, and may be selected from those generally used for fluorine-based greases, as required. These base oils may be used either individually or in combination.

PTFE may be spherical, polyhedral (cubic or rectangular parallelepiped), or needle-shaped in an extreme case. PTFEs may be used either individually or in combination.

PTFE is incorporated at 15 to 42.5% by mass, preferably 15 to 35% by mass, based on the amount of the fluorine-based grease.

<Composition of the Grease Composition>

The grease composition for use in the present invention comprises at least one of metal complex soap-based grease and urea-based grease, and fluorine-based grease, mixed in an at least one of metal complex soap-based grease and urea-based grease versus fluorine-based grease ratio of 40 to 80:60 to 20 by mass. The composition comprising the fluorine-based grease at above 60% by mass, based on the amount of the composition, may not exhibit sufficient rust preventive characteristics, because of insufficient content of the metal complex soap-based grease and/or urea-based grease, and hence of the mineral or synthetic oil as the base oil present therein, with the result that a rust preventive agent may not be incorporated to an effective extent. Moreover, the increased content of the fluorine-based grease pushes up the starting material cost of the grease composition to a level equivalent to that of the fluorine-based grease. At below 20% by mass based on the amount of the grease composition, on the other hand, the fluorine-based grease content may be too low to impart sufficient resistance to heat to the grease composition, leading to insufficient serviceability of the bearing before seizure.

A total content of the thickening agents (i.e., the metallic soap, urea compound and PTFE) in the grease composition is set at 20 to 30% by mass based on the amount of the grease composition. The grease composition containing the thickening agents at below 20% by mass based on the amount of the grease composition may have shortened service life before seizure, due to the phase separation and reduced stability to shear stress, which can cause leakage of the grease. At a thickening agent content above 30% by mass based on the amount of the grease composition, on the other hand, the grease may be too fluid to go into the rolling plane between the inner or outer ring of the bearing and rolling elements, possibly causing the problems related to service life before seizure or low-temperature characteristics of the grease.

<Worked Penetration of the Grease Composition>

Worked penetration of the grease composition is preferably in a range of NLGI No. 0 to 3, after at least one of metal complex soap-based grease and urea-based grease is mixed with the fluorine-based grease.

<Additives>

The grease composition may be incorporated with one or more known additives commonly used for greases, as required, to further improve its characteristics. The additive is incorporated in the metal complex soap-based grease or urea-based grease in consideration of solubility of the base oil. The additives useful for the present invention include gelatinizing agent, e.g., benton and silica gel; antioxidant, e.g., amine-, phenol- and sulfur-based one, and zinc dithiophosphate; extreme-pressure agent, e.g., chlorine-, sulfur- and phosphorus-based one, zinc dithiophosphate and organomolybdenum; oiliness agent, e.g., fatty acid, and animal and vegetable oil; rust preventive agent, e.g., petroleum-derived sulfonate, dinonylnaphthalene sulfonate and sorbitan ester; metal deactivator, e.g., benzotriazole and sodium nitrite; and viscosity index improver, e.g., polymethacrylate, polyisobutylene and polystyrene. They may be used either individually or in combination. Of these, the antioxidant and rust preventive agent are more preferable, because the rolling bearing of the present invention, for which the grease is used, is set in a section which is exposed to high temperature or water. Content of the additive(s) may be 20% by mass or less based on the amount of the grease composition, although not limited so long as the original object of the present invention is attained.

<Method of Producing the Grease Composition>

The methods of producing the metal complex soap-based grease and urea-based grease as the components of the grease composition are not limited, and each is produced by the reaction of the thickening agent in the base oil. It is necessary to uniformly disperse the additive, when it is used, by an adequate means, e.g., kneader or roll mill, to sufficiently stir and knead the additive-containing composition. Heating is effective for the stirring/kneading treatment.

The method of producing the fluorine-based grease is not limited. It is produced by kneading perfluoropolyether oil incorporated with powdered PTFE by a 3-stage roll mill or the like.

The grease composition is produced by sufficiently stirring and kneading at least one of metal complex soap-based grease and urea-based grease, and fluorine-based grease mixed with each other in a given ratio by an adequate means, e.g., kneader or roll mill, to uniformly disperse these components in each other. Heating is effective for the above treatment.

The present invention is described in more detail by Examples and Comparative Examples, which by no means limit the present invention.

EXAMPLES 1 to 8 and COMPARATIVE EXAMPLES 1 to 8

The urea-based grease, metal complex soap-based grease and fluorine-based grease, each having the composition given in Tables 1 and 2, were prepared. For preparation of the urea-based grease, a base oil incorporated with diisocyanate was reacted with another base oil incorporated with amine with stirring under heating to produce the semi-solid substance, to which an amine-based antioxidant dissolved beforehand in the base oil was added, and the mixture was sufficiently stirred, where quantities of diisocyanate and amine were set to have the thickening agent quantity in Table 2. For preparation of the metal complex soap-based grease, 12-hydroxystearic acid was reacted with lithium hydroxide for saponification (primary saponification), to which a dibasic acid and lithium hydroxide were added for another stage of saponification (secondary saponification), and the resultant grease was heated to 180° C., on completion of the saponification process. It was mixed with the base oil, and the mixture was kneaded by a 3-stage roll mill, after it was cooled to room temperature, to produce the metal complex soap-based grease. For preparation of the fluorine-based grease, PFPE was sufficiently mixed with 30 or 22% by mass, based on the amount of the fluorine-based grease, of powdered PTFE, and the mixture was kneaded by a 3-stage roll mill.

TABLE 1

| | | Comp. Ex. 1 | Ex. 1 | Ex. 2 | Ex. 3 | Ex. 4 | Comp. Ex. 2 | Comp. Ex. 3 | Comp. Ex. 4 |
|---|---|---|---|---|---|---|---|---|---|
| A | Thickening agent | Lithium complex soap | | | | | | | |
| | Content of thickening agent (% by mass) | 25 | | | | | | | |
| | Base oil | Ester oil | | | | | | | |
| | Kinematic viscosity of the base oil (mm$^2$/second at 40° C.) | 70 | | | | | | | |

TABLE 1-continued

|   |   | Comp. Ex. 1 | Ex. 1 | Ex. 2 | Ex. 3 | Ex. 4 | Comp. Ex. 2 | Comp. Ex. 3 | Comp. Ex. 4 |
|---|---|---|---|---|---|---|---|---|---|
| B | Content of PTFE (% by mass) |   |   |   |   | 30 |   |   |   |
|   | Kinematic viscosity of PFPE (mm$^2$/second at 40° C.) |   |   |   |   | 190 |   |   |   |
| Mixing ratio | Content of A (% by mass) | 100 | 80 | 70 | 60 | 40 | 20 | 10 | 0 |
|   | Content of B (% by mass) | 0 | 20 | 30 | 40 | 60 | 80 | 90 | 100 |
|   | Total content of the thickening agents (% by mass) | 25 | 26 | 26.5 | 28 | 28 | 29 | 29.5 | 30 |
|   | Worked Penetration (NLGI) |   |   |   |   | No. 2 |   |   |   |

A: Metal complex soap-based grease
B: Fluorine-based grease

TABLE 2

|   |   | Comp. Ex. 5 | Comp. Ex. 6 | Ex. 5 | Ex. 6 | Ex. 7 | Ex. 8 | Comp. Ex. 7 | Comp. Ex. 8 |
|---|---|---|---|---|---|---|---|---|---|
| A | Thickening agent |   |   |   | Diurea |   |   |   |   |
|   | Content of thickening agent (% by mass) | 10 | 15 | 20 | 20 | 22 | 25 | 25 | 28 |
|   | Base oil |   |   |   | Ether oil |   |   |   |   |
|   | Kinematic viscosity of the base oil (mm$^2$/second at 40° C.) |   |   |   | 100 |   |   |   |   |
| B | Content of PTFE (% by mass) | 20 | 21 | 20 | 28 | 34 | 35 | 41 | 42 |
|   | Kinematic viscosity of PFPE (mm$^2$/second at 40° C.) |   |   |   | 60 |   |   |   |   |
| Mixing ratio | Content of A (% by mass) | 50 | 50 | 50 | 50 | 50 | 50 | 50 | 50 |
|   | Content of B (% by mass) | 50 | 50 | 50 | 50 | 50 | 50 | 50 | 50 |
|   | Total content of the thickening agents (% by mass) | 15 | 18 | 20 | 24 | 28 | 30 | 32 | 35 |
|   | Worked Penetration (NLGI) |   |   |   | No. 1-3 |   |   |   |   |

A: Urea-based grease
B: Fluorine-based grease

The metal (lithium) complex soap-based grease was mixed with the fluorine-based grease containing 30% by mass, based on the amount of the fluorine-based grease, of PTFE in the mass ratio given in Table 1, and the mixture was treated by a roll mill, to prepare each grease composition for testing. The numeral expressed with the unit "ratio by mass" or "mass ratio" as used herein is the almost the same as the numeral expressed with the unit "ratio by weight" or "weight ratio". Each of these grease composition had a worked penetration of around NLGI No.2. Each composition was packed in the test bearing for the seizure and rust-preventive tests, described below. The results are given in FIG. 2, where the •-marked plot represents the seizure test results, and Δ-marked one represents the rust-preventive test results.

The urea-based grease was mixed with the fluorine-based grease in the mass ratio given in Table 2, and the mixture was treated by a roll mill, to prepare each grease composition for testing. Each of these grease composition had a worked penetration of NLGI No.1 to 3. Each composition was packed in the test bearing for the seizure and rust-preventive tests, described below. The results are given in FIG. 3, where the •-marked plot represents the seizure test results, and Δ-marked one represents the grease leakage test results.

(Seizure Test)

Each grease composition was packed in the ball bearing set in a deep groove, provided with a shielding plate of iron (inner diameter: 8 mm, outer diameter: 22 mm, width: 7 mm) in such a way to account for 50% of the space. The bearing was continuously rotated under the conditions of rotating speed of the inner ring: 3,000 minute$^{-1}$, bearing temperature: 180° C. and axial load: 59N. The test was terminated, when temperature of the bearing's outer ring was increased to 190° C. or higher on account of the seizure. The bearing was judged to pass the test, when it could work for 1,000 hours or longer. A total of 4 test runs were conducted for the same bearing sample.

(Rust-preventive Test)

Each grease composition was packed in the ball bearing set in a deep groove, provided with a rubber seal (inner diameter: 17 mm, outer diameter: 47 mm, width: 14 mm) in such a way to account for 50% of the space. The bearing was rotated at 1,800 minute$^{-1}$ for 30 seconds as the breaking-in period. Then, 0.5 cc of saline water (0.5% by mass) was injected into the ball bearing, and it was rotated again at 1,800 minute$^{-1}$ for 30 seconds as the breaking-in period. It was left in a constant-humidity, constant-temperature tank, kept at 80° C. and 100% RH, for 48 hours, and then disassembled, to visually observe the rusted conditions of the raceway surface. The rusted conditions were evaluated according to the following standards:

7: No rust was observed
6: Stain-like rust (fine, stain-like rust) observed
5: Point-like rust (diameter: 0.3 mm or less) observed
4: Small-size rust (diameter: 1.0 mm or less) observed
3: Medium-size rust (diameter: 5.0 mm or less) observed
2: Large-size rust (diameter: 10.0 mm or less) observed
1: Very large-size rust observed (the surface was rusted almost over the entire face).

The bearings evaluated at #7 to 5 were judged to be good, and those evaluated at #4 to 1 were judged to be defective.

(Grease Leakage Test)

Each grease composition was packed in the ball bearing set in a deep groove, provided with a rubber seal (inner diameter: 17 mm, outer diameter: 40 mm, width: 12 mm) in such a way to account for 35% of the bearing space. The bearing was rotated for 20 hours under the conditions of rotating speed of the inner ring: 14,500 minute$^{-1}$, bearing's outer ting temperature: 180° C. and axial load: 200N, to measure quantity of the grease leaking out before the test was terminated. A total of 4 test runs were conducted for the same bearing sample. The bearing was judged to pass the test, when the leakage quantity was 10% by mass or less based on the amount of the grease composition packed.

Figure 2:
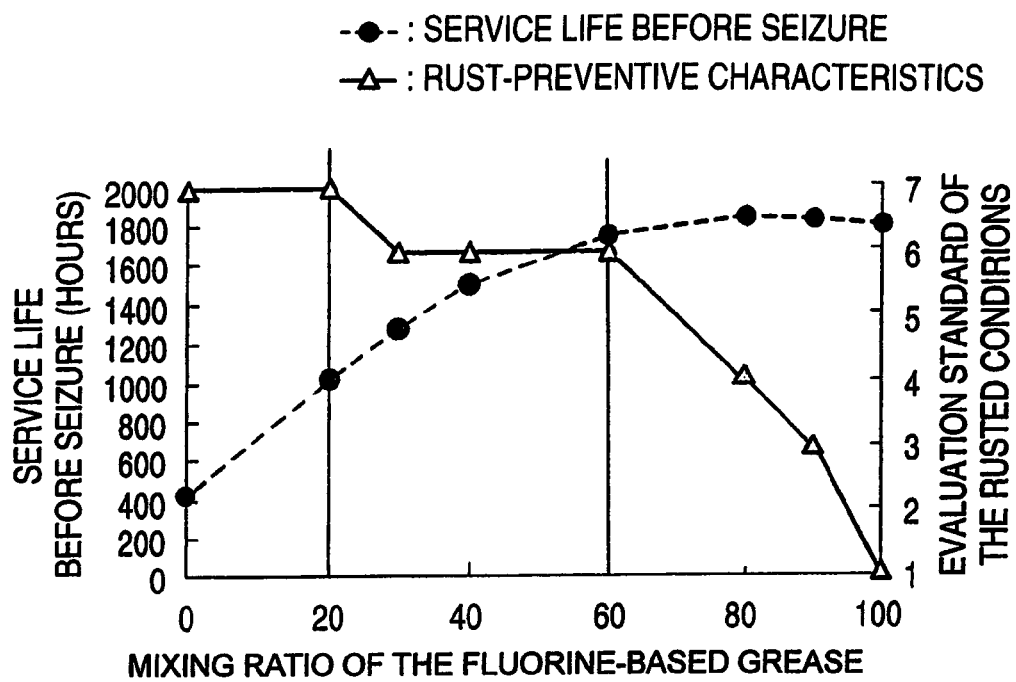
FIG. 2 is the graph showing the seizure and rust-preventive test results for the bearings prepared in Examples and Comparative Examples.
Figure 3:
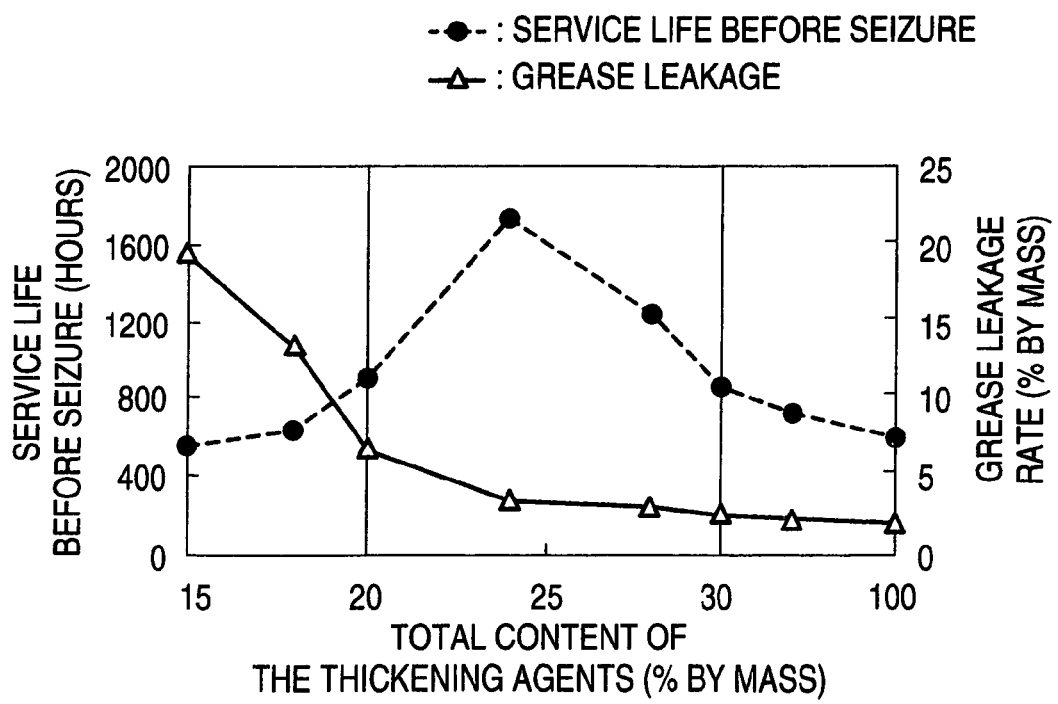
FIG. 3 is the graph showing the seizure and grease age test results for the bearings prepared in Examples Comparative Examples.

As shown in FIGS. 2 and 3, the bearing has improved service life before seizure, when lubricated by the grease composition containing the metal (Li) complex soap-based grease in a ratio of 40 to 80% by mass based on the amount of the grease composition, and thickening agents at a total content of 20 to 30% by mass based on the amount of the grease composition. It is also shown that these grease compositions control rusting (FIG. 2) and grease leakage (FIG. 3).

As described above, the present invention provides the rolling bearing which has the long service life before seizure at high temperature as the property which comes from the fluorine-based grease, has the rust preventive characteristics and fluidity at low temperature as the properties which come from the synthetic oil-based grease, and is lubricated by the relatively inexpensive grease composition packed therein. The rolling bearing of the present invention is suitable for the devices working under severe conditions, e.g., electrically driven motors, couplings or the like for cooling fans which send cooling air to automobile engine radiators, because they are exposed to temperature varying over a wide range from high temperature to low temperature, and to rainwater, which can cause rust of these devices.

While the invention has been described in detail and with reference to specific embodiments thereof, it will be apparent to one skilled in the art that various changes and modifications can be made therein without departing from the spirit and scope thereof.

What is claimed is:

1. A rolling bearing holding two or more rolling elements between inner and outer rings in such a way that these rolling elements can freely roll, and packed with a grease, wherein said grease is a grease composition comprising a mixture of metal complex soap-based grease containing a base oil, the base oil of the metal complex soap-based grease independently comprises a mineral oil or a synthetic oil selected from the group consisting of hydrocarbon-, aromatic-, ester-, and ether-based oils, each used either individually or as a mixed oil, the metal complex soap-based grease incorporated with 20 to 35% by mass, based on the amount of the metal complex soap-based grease, of metal complex soap as a thickening agent, and fluorine-based grease comprising perfluoropolyether oil as a base oil incorporated with 20 to 42.5% by mass, based on the amount of fluorine-based grease, of polytetrafluoroethylene as a thickening agent, ratio of said metal complex soap-based grease versus said fluorine-based grease being 40 to 50:60 to 50 by mass, and total content of the thickening agents being 24 to 30% by mass based on the amount of the grease composition, wherein the rolling bearing is a rolling bearing for automobiles.

2. The rolling bearing as claimed in claim 1, wherein the fluorine-based grease comprises perfluoropolyether oil having a kinematic viscosity at 40° C. of 20 to 400 mm$^2$/s as a base oil.

3. The rolling bearing as claimed in claim 1, wherein the metal complex soap-based grease comprises mineral or synthetic oil having a kinematic viscosity at 40° C. of 10 to 400 mm$^2$/s as a base oil.

4. The rolling bearing as claimed in claim 3, wherein the synthetic oil is an ester oil, an ether oil or a mixture thereof.

5. A rolling bearing holding two or more rolling elements between inner and outer rings in such a way that these rolling elements can freely roll, and packed with a grease, wherein said grease is a grease composition comprising a mixture of urea-based grease containing a base oil, the base oil of the urea-based grease independently comprises a mineral oil or a synthetic oil selected from the group consisting of hydrocarbon-, aromatic-, ester-, and ether-based oils, each used either individually or as a mixed oil, the urea-based grease incorporated with 20 to 35% by mass, based on the amount of the urea-based grease, of metal complex soap as a thickening agent, and fluorine-based grease comprising perfluoropolyether oil as a base oil incorporated with 20 to 42.5% by mass, based on the amount of fluorine-based grease, of polytetrafluoroethylene as a thickening agent, ratio of said urea-based grease versus said fluorine-based grease being 40 to 50:60 to 50 by mass, and total content of the thickening agents being 24 to 30% by mass based on the amount of the grease composition, wherein the rolling bearing is a rolling bearing for automobiles.

6. The rolling bearing as claimed in claim 5, wherein the fluorine-based grease comprises perfluoropolyether oil having a kinematic viscosity at 40° C. of 20 to 400 mm$^2$/s as a base oil.

7. The rolling bearing as claimed in claim 5, wherein the urea-based grease comprises mineral or synthetic oil having a kinematic viscosity at 40° C. of 10 to 400 mm$^2$/s as a base oil.

8. The rolling bearing as claimed in claim 7, wherein the synthetic oil is an ester oil, an ether oil or a mixture thereof.

* * * * *